Figure 1:
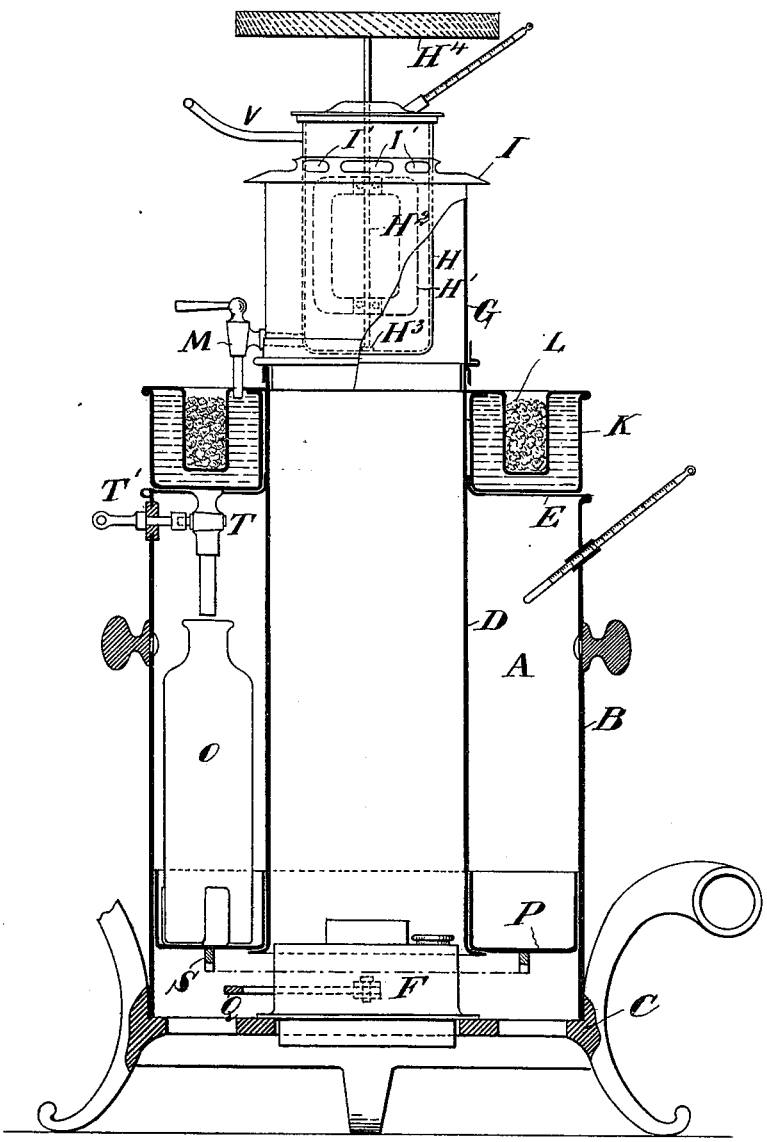

No. 615,050. Patented Nov. 29, 1898.
E. G. N. SALENIUS.
APPARATUS FOR CONTINUOUSLY STERILIZING MILK, &c.
(Application filed Sept. 14, 1897.)
(No Model.) 2 Sheets—Sheet 1.

WITNESSES:

INVENTOR

No. 615,050. Patented Nov. 29, 1898.
E. G. N. SALENIUS.
APPARATUS FOR CONTINUOUSLY STERILIZING MILK, &c.
(Application filed Sept. 14, 1897.)
(No Model.) 2 Sheets—Sheet 2.
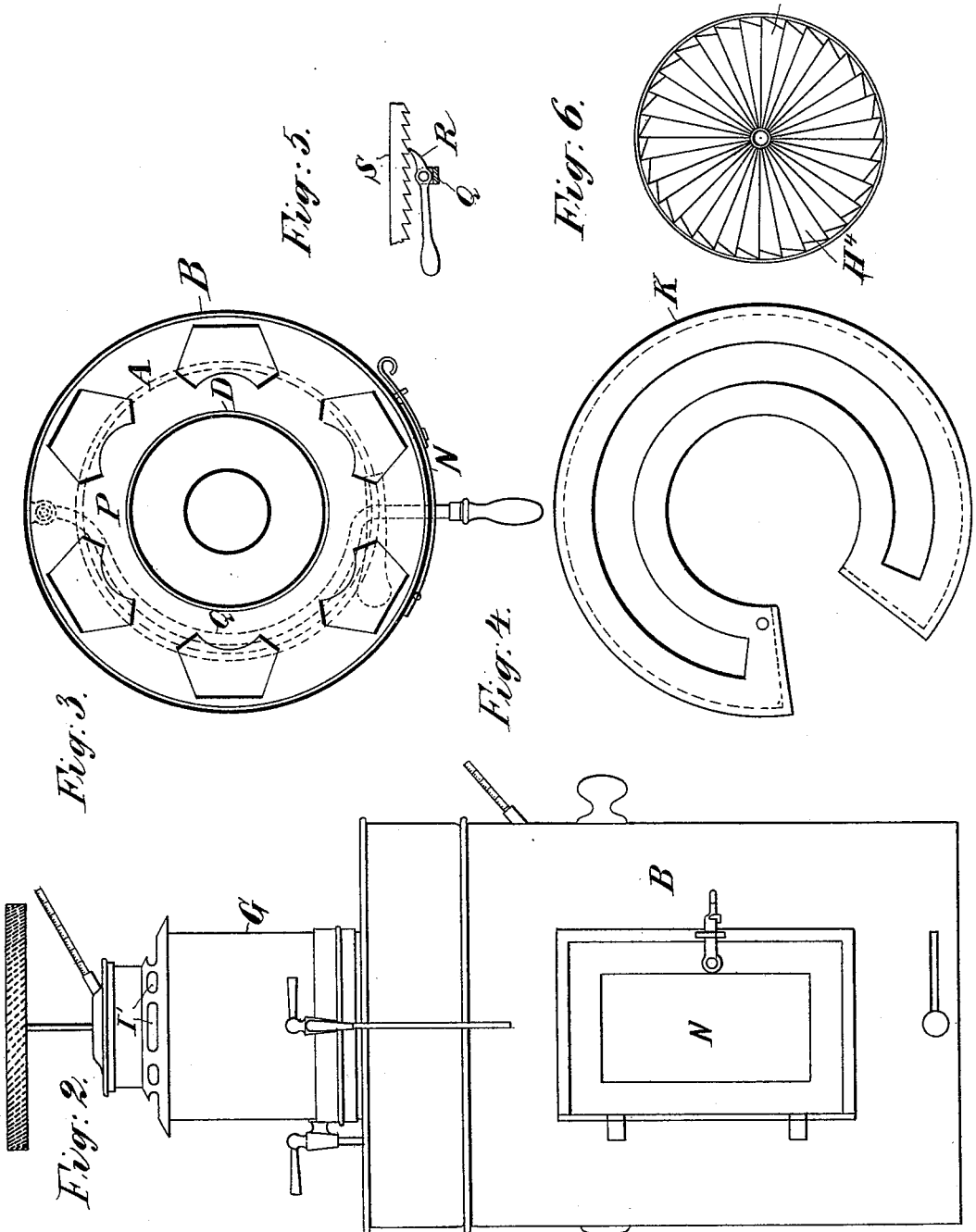
WITNESSES: INVENTOR
Erik G. N. Salenius
BY
Henry Connett
ATTORNEY

United States Patent Office.

ERIK GUSTAF NICOLAUS SALENIUS, OF ALBANO, SWEDEN.

APPARATUS FOR CONTINUOUSLY STERILIZING MILK, &c.

SPECIFICATION forming part of Letters Patent No. 615,050, dated November 29, 1898.

Application filed September 14, 1897. Serial No. 661,591. (No model.)

*To all whom it may concern:*

Be it known that I, ERIK GUSTAF NICOLAUS SALENIUS, engineer, a subject of the King of Sweden and Norway, and a resident of Albano, in the Kingdom of Sweden, have invented certain new and useful Improvements in Apparatus for Continuously Sterilizing Milk and other Liquids, of which the following is a specification, reference being had therein to the accompanying drawings.

This invention relates to apparatus for sterilizing any liquid; but the apparatus is especially adapted for milk serving as nourishment for infants. It is therefore provided with heating and cooling arrangements, as well as with an arrangement for heating the bottles before the sterilized milk is tapped into them.

The apparatus consists of a great compartment for the bottles, through which compartment ascends a heat-passage. Above this passage is located the vessel wherein the milk is heated. Above the first-mentioned compartment, which is annular in consequence of the heat-passage, is a cooling vessel from which the milk is tapped into the bottles, which are placed under the cooling vessel and which may successively be carried under a cock in the bottom of said vessel by turning the bottom on which the bottles rest.

Figure 1 shows a vertical section of this apparatus; Fig. 2, an elevation, and Fig. 3 a cross-section, of the same. Fig. 4 shows the cooling vessel in plan, and Figs. 5 and 6 show details.

The annular compartment A for the bottles is formed between an outer cylinder B, resting on a foot C, and an inner cylinder D, which is connected to a flange E, fixed to the cylinder B. Under the cylinder D there is a lamp F or the like, the cylinder thus forming the heat-passage. At the top the cylinder D has a loose extension G, on which rests the narrower vessel H by the aid of a ring I, provided with openings I'. The flange E, forming the top of the annular compartment A, supports the cooling vessel K, which also is annular, this vessel having an inner compartment L for the cooling agent. The cooling vessel K, which is hermetically closed, communicates with the vessel H through a cock M. The bottles O, introduced into the compartment A through a door N, rest on a revoluble bottom P, which may be put in motion by means of a lever Q, the pawl R of which engages in a toothed rack S on the lower side of the bottom P. By this arrangement the bottles may successively be carried under the cock T in the bottom of the vessel K, the key T' of this cock protruding through the cylinder B. Through a pane on this cylinder the placing of the bottles straight below the nozzle of the cock T may be controlled. The vessel H contains an agitator H', which is mounted on a shaft $H^2$, resting in a small step-bearing $H^3$ and ascending through the cover of the vessel H. Above this cover the shaft $H^2$ carries a wing-wheel or shovel-wheel $H^4$. (See Fig. 6.) This wheel is acted upon and rotated by the hot air ascending through the openings I', the agitator thus being rotated continuously. The milk being sufficiently heated for being sterilized is tapped from the vessel H, which is either filled for once or continuously fed with milk through a suitable pipe V into the vessel K, where it is cooled without coming into contact with the atmosphere. Also in the compartment A the temperature is sufficiently high for killing all bacteria and the like which may be in the air, on the bottles, on plugs, &c., introduced into the compartment A. A bottle being filled, a plug is introduced in the same.

Having now described my invention, what I claim as new, and desire to secure by Letters Patent, is—

1. An apparatus for sterilizing liquids, especially milk, intended to be tapped into bottles, having a compartment A, containing the bottles through which ascends a comparatively wide heat-passage D, the vessel H, in which the liquid is heated, situated above the compartment A, and a closed cooling vessel K, situated above the compartment A, into which the liquid is drawn from the vessel H, situated at a higher level, said vessel K having in its bottom a cock T, for tapping the milk into the bottles O, in the compartment A and under the vessel K.

2. In an apparatus for sterilizing liquids, especially milk, intended to be tapped into bottles, the combination with the compartment A, for the bottles, and the heating and cooling vessels situated above the compartment A, of the revoluble bottom P in the compartment A, on which the bottles rest, a toothed rack S, on the lower side of said bottom, an operating lever or arm Q, and a pawl R, carried by said arm and engaging the rack, whereby the said bottom is shifted in order to bring the bottles successively in position to be filled.

3. In an apparatus for sterilizing liquids, the combination with the compartment A, having in it the cylinder D, forming a flue or heat-passage, of the said cylinder, the loose extension G, on the top of said cylinder, the heating vessel H within said extension and of less diameter than the latter, the said vessel H having an apertured ring flange I which rests on the top of the extension G, an agitator H', in the vessel H, the shaft of said agitator projecting out through the cover of the vessel H and being provided with a wing-wheel $H^4$, and the said wing-wheel, whereby the hot gases ascending through the cylinder D and extension G act upon the said wheel $H^4$ to rotate the agitator.

In witness whereof I have hereunto signed my name in the presence of two subscribing witnesses.

ERIK GUSTAF NICOLAUS SALENIUS.

Witnesses:
H. B. OHLSSON,
E. HERMANSSON.